United States Patent [19]
Nakata

[11] Patent Number: 5,909,582
[45] Date of Patent: Jun. 1, 1999

[54] MICROCOMPUTER HAVING USER MODE INTERRUPT FUNCTION AND SUPERVISOR MODE INTERRUPT FUNCTION

[75] Inventor: Junichi Nakata, Tokyo, Japan

[73] Assignee: NEC Corporation, Tokyo, Japan

[21] Appl. No.: 08/847,627

[22] Filed: Apr. 28, 1997

[30] Foreign Application Priority Data

Apr. 26, 1996 [JP] Japan .................................. 8-106542

[51] Int. Cl.⁶ ...................................................... G06F 9/46
[52] U.S. Cl. ........................................... 395/737; 395/733
[58] Field of Search .................................... 395/733–742

[56] References Cited

U.S. PATENT DOCUMENTS

| | | | |
|---|---|---|---|
| 4,727,480 | 2/1988 | Albright et al. | 364/200 |
| 4,831,518 | 5/1989 | Yu et al. | 364/200 |
| 4,967,342 | 10/1990 | Lent et al. | 364/200 |
| 5,222,215 | 6/1993 | Chou et al. | 395/275 |
| 5,274,834 | 12/1993 | Kardach et al. | 395/800 |
| 5,325,512 | 6/1994 | Takahashi | 395/500 |
| 5,394,544 | 2/1995 | Motoyama et al. | 395/575 |
| 5,410,709 | 4/1995 | Yu | 395/725 |
| 5,438,677 | 8/1995 | Adams et al. | 395/736 |
| 5,506,997 | 4/1996 | Maguire et al. | 395/800 |
| 5,530,874 | 6/1996 | Emery et al. | 395/735 |
| 5,701,494 | 12/1997 | Satoh | 395/735 |

FOREIGN PATENT DOCUMENTS 59-216253 12/1984 Japan .

Primary Examiner—Ayaz R. Sheikh
Assistant Examiner—Jigar Pancholi
Attorney, Agent, or Firm—Sughrue, Mion, Zinn, Macpeak & Seas, PLLC

[57] ABSTRACT

In a microcomputer including a central processing unit (CPU), a user mode interrupt control circuit for generating a user mode interrupt request signal and transmitting the user mode interrupt request signal to the CPU, and a supervisor mode interrupt control circuit for generating a supervisor interrupt request signal, a selector circuit is connected to the CPU, the user mode interrupt control circuit and the supervisor mode interrupt control circuit. When the selector circuit is in a first state, the supervisor mode interrupt request signal is transmitted from the supervisor mode interrupt control circuit directly to the CPU. When the selector is in a second state, the supervisor mode interrupt request signal is transmitted from the supervisor mode interrupt control circuit via the user mode interrupt control circuit to the CPU.

9 Claims, 12 Drawing Sheets

MICROCOMPUTER HAVING USER MODE INTERRUPT FUNCTION AND SUPERVISOR MODE INTERRUPT FUNCTION

BACKGROUND OF THE INVENTION

1. Field of the Invention

The present invention relates to a microcomputer having a user mode interrupt function and a supervisor (SV) mode interrupt function.

2. Description of the Related Art

In a microcomputer, in order to debug an applied system, an in-circuit emulator, i.e., a supervisor mode interrupt control circuit is provided in addition to a user mode interrupt control circuit. This will be explained later in detail.

In a prior art microcomputer, an SV mode interrupt has the highest priority, that is, the SV mode interrupt has the highest priority over any of user mode interrupts. Therefore, when an SV mode interrupt occurs, any user mode interrupt. In addition, during a time period where an SV mode interrupt is carried out, any user mode interrupt is prohibited, which may destroy the system.

Further, in the prior art microcomputer, the content of a program counter and a processor status word are stored in a stack (memory) both during a user mode interrupt and an SV mode interrupt, which may restrict the region of the stack for the user mode interrupt processing.

SUMMARY OF THE INVENTION

It is an object of the present invention to provide a microcomputer capable of changing the priority of an SV mode interrupt over user mode interrupts.

According to the present invention, in a microcomputer including a central processing unit (CPU), a user mode interrupt control circuit for generating a user mode interrupt request signal and transmitting the user mode interrupt request signal to the CPU, and a supervisor mode interrupt control circuit for generating a supervisor interrupt request signal, a selector circuit is connected to the CPU, the user mode interrupt control circuit and the supervisor mode interrupt control circuit. When the selector circuit is in a first state, the supervisor mode interrupt request signal is transmitted from the supervisor mode interrupt control circuit directly to the CPU. When the selector is in a second state, the supervisor mode interrupt request signal is transmitted from the supervisor mode interrupt control circuit via the user mode interrupt control circuit to the CPU.

Thus, when the selector circuit is in the second state, an SV mode interrupt can be treated as a kind of user mode interrupt.

BRIEF DESCRIPTION OF THE DRAWINGS the present invention will be more clearly understood from the description as set forth below, as compared with the prior art with reference to the accompanying drawings, wherein.

DESCRIPTION OF THE PREFERRED EMBODIMENT

Before the description of the preferred embodiment, a prior art microcomputer having an in-circuit emulator will be explained with reference to FIGS. 1 and 2.

Figure 1:
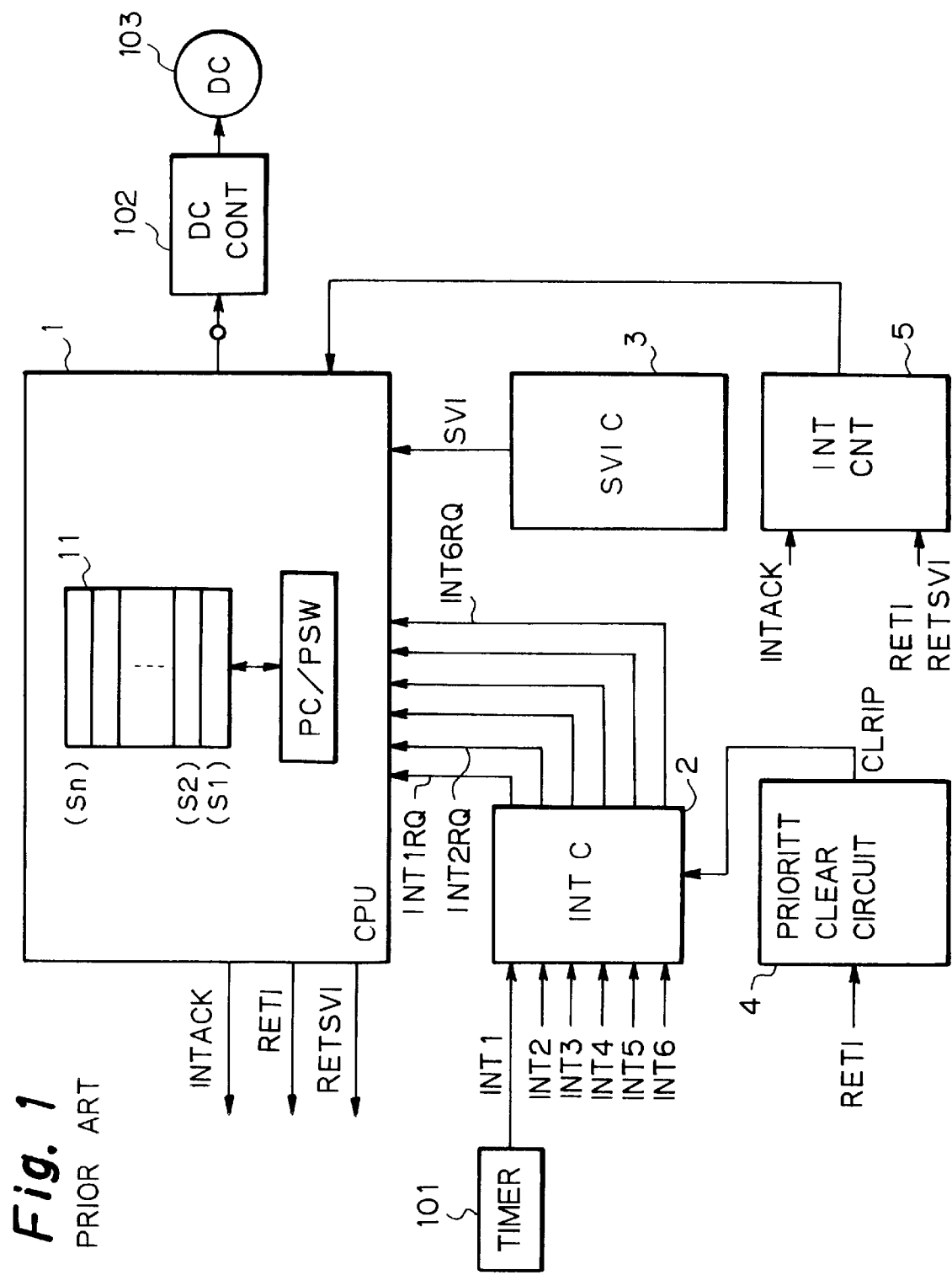
FIG. 1 is a block circuit diagram illustrating a prior art microcomputer.
Figure 2:
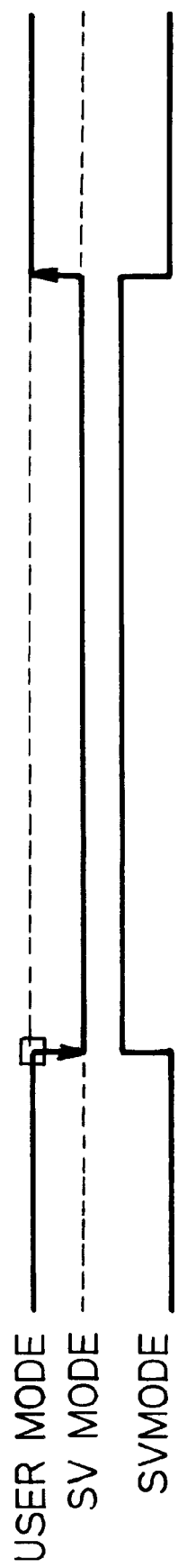
FIG. 2 is a timing diagram for showing the operation of the microcomputer of FIG. 1.

In FIG. 1, reference numeral 1 designates a CPU which receives user mode interrupt request signals INT1RQ, INT2RQ, . . . , INT6RQ, and an in-circuit emulation (IE) interrupt request signal or a supervisor (SV) interrupt request signal SVI from a user mode interrupt terminals INT1, INT2, . . . , INT6. The interrupt terminals INT1, INT2, . . . , INT6 have a predetermined precedence relation.

Also, in FIG. 1, a user mode interrupt priority clear circuit 4 and an interrupt counter 5 are provided. When the CPU 1 receives an interrupt request signal, the CPU 1 generates an interrupt permission signal INTACK and transmits it to the interrupt counter 5. Also, when a return occurs by a user mode interrupt processing or an SV interrupt processing, the CPU 1 generates an interrupt return signal RETI or RETSVI. The interrupt return signal RETI is supplied to the user mode interrupt priority clear circuit 4 and the interrupt counter 5, and the interrupt return signal RETSVI is supplied to the interrupt counter 5.

The interrupt priority clear circuit 4 is used for clearing a bit of a register provided in the user mode interrupt control circuit 2 which bit shows what interrupt terminal a user mode interrupt processing on execution is related to. After such a bit is cleared, the user mode interrupt control circuit 2 sets a bit corresponding to a user mode interrupt processing having the second priority.

The interrupt counter 5 is counted up by receiving the interrupt permission signal INTACK, and is counted down by receiving the interrupt return signal RETI or RETSVI. The value INTCNT of the interrupt counter 5 is supplied to the CPU 1.

The CPU 1 includes a stack 11 for temporarily storing the contents of a program counter (PC) and a processor status word (PSW).

Assume that the microcomputer of FIG. 1 is applied to a control for a DC motor. In this case, a timer 101 is connected to the interrupt terminal INT1, and an output port of the CPU 1 is connected to a DC motor control circuit 102 for controlling a DC motor 103. Thus, the power of the DC motor 103 is controlled by a timer interrupt routine which is carried out at every time period defermined by the timer 101.

In the prior art microcomputer of FIG. 1, the SV mode interrupt has a highest priority, that is, the SV mode interrupt has the highest priority over any of the user mode interrupts. Therefore, as shown in FIG. 2, when an SV mode interrupt occurs, any user mode is transferred to an SV interrupt mode. In addition, during a time period where such an SV mode interrupt is carried out, any user mode interrupt is prohibited. Thus, the power of the DC motor 103 is maintained for the above-mentioned time period. Therefore, if the power of the DC motor 103 is too high immediately before the entry of the SV mode interrupt, the wiring of the DC motor 103 may be burned.

Figure 3:
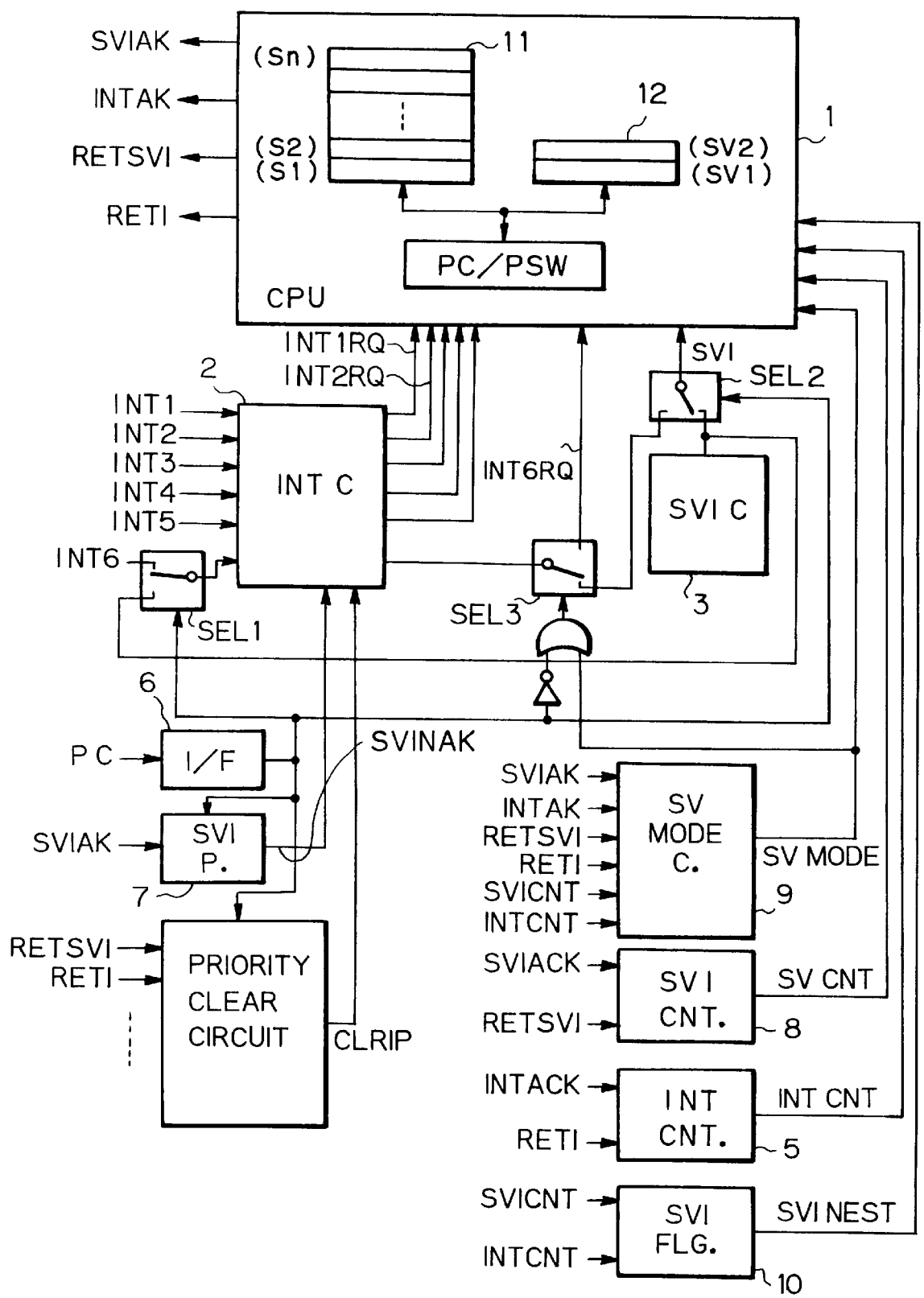
FIG. 3 is a block circuit diagram illustrating an embodiment of the microcomputer according to the present invention.

In FIG. 3, which illustrates an embodiment of the microcomputer according to the present invention, three selectors SEL1, SEL2 and SEL3 and an interface 6 for controlling the selectors SEL1, SEL2 and SEL3 are provided.

For example, when the output of the interface 6 is low, the selector SEL1 connects the interrupt terminal INT6 to the user mode interrupt control circuit 2, the selector SEL2 connects the SV mode interrupt control circuit 3 to the CPU 1, and the selector SEL3 connects the output of the user mode interrupt control circuit 2 to the CPU 1. This state corresponds to the microcomputer of FIG. 1.

On the other hand, when the output of the interface 6 is high, the selector SEL1 connects the output of the SV mode interrupt control circuit 3 to the user mode interrupt control circuit 2, and the selector SEL2 connects the output of the user mode interrupt control circuit to the CPU 1 in accordance with the state of the selector SEL3 That is, the CPU 1 receives an SV mode interrupt signal SVI via the user mode interrupt control circuit 2, and in this case, the SV mode interrupt signal SVI can be considered as a kind of user mode interrupt signal.

The interface 6 is connected to a personal computer or the like.

The CPU 1 includes a special register 12 for temporarily storing the contents of the PC/PSW when the interrupt control is transferred from a user mode to an SV mode or from an SV mode to a user mode during the SV mode.

When allowing an SV mode interrupt, the CPU 1 generates an SVI permission signal SVIAK. When allowing a user mode interrupt, the CPU 1 generates an interrupt permission signal INTAK. In this case, after the contents of the PC/PSW are moved to the stack 11 or the register 12, an interrupt routine is carried out.

When returning from an SV mode interrupt routine, the CPU 1 generates an SVI return signal RETSVI. When returning from a user mode interrupt routine, the CPU 1 generates an INT return signal RETI. In this case, the contents of the stack 11 or the register 12 are read to restore the PC/PSW.

An SVI permission circuit 7 receives the SVI permission signal SVINAK from the CPU 1 to generate an SVI permission signal SVINAK for the user mode interrupt control circuit 2.

The user mode interrupt priority clear circuit 4 also receives the SVI return signal RETSVI from the CPU 1. In this case, the SVI return signal RETSVI is enabled or disabled in accordance with the output of the interface 6.

The interrupt counter 5 is used only for a user mode. That is, the interrupt counter 5 is counted up by receiving the user mode interrupt permission signal INTACK from the CPU 1, and is counted down by receiving the user mode interrupt return signal RETI from the CPU 1.

An SV interrupt counter 8 is used only for an SV mode. That is, the interrupt counter 8 is counted up by receiving the SV mode interrupt permission signal SVIACK from the CPU 1, and is counted down by receiving the SVI mode interrupt return signal RETI from the CPU 1.

An SV mode control circuit 8 receives the SV mode interrupt permission signal INTAK, the SV mode interrupt return signal RETSVI and the user mode interrupt return signal RETI from the CPU 1, the count value SVICNT from the SV mode interrupt counter 8, and the count value INTCNT from the user mode interrupt counter 5, to generate an SV mode signal SVMODE for showing an SV mode. For example, when the SV mode interrupt permission signal SVIAK is made high, the SV mode signal SVMODE becomes high (="1"). Also, when the return signal RETI is high, the count value INTCNT is "1" and the count value SVCNT is "1", the SV mode signal SVMODE becomes high (="1"). Further, when the SV mode interrupt return signal RETSVI is made high, or when the user mode interrupt permission signal INTAK is made high, the SV mode signal SVMODE becomes low (="0").

An SVI flag control circuit 10 receives the count value SVCNT of the SV mode interrupt counter 8 and the count value INTCNT of the user mode interrupt counter 4 to generate a flag signal SVINEST. When the count value SVCNT is "2", the flag signal SVINEST is set. On the other hand, when the counter value SVCNT and INTCNT are both "1", the flag signal SVINEST is reset.

The operation of the CPU 1 of FIG. 3 is explained next with reference to FIGS. 4, 5 and 6 where the output of the interface 6 is high so that the output of the SV mode interrupt control circuit 3 is connected via the selectors SEL2 and SEL1 to the user mode interrupt control circuit 2. That is, the interrupt terminal INT6 seems to be a terminal for generating an SV mode interrupt request signal SVI.

Figure 4:
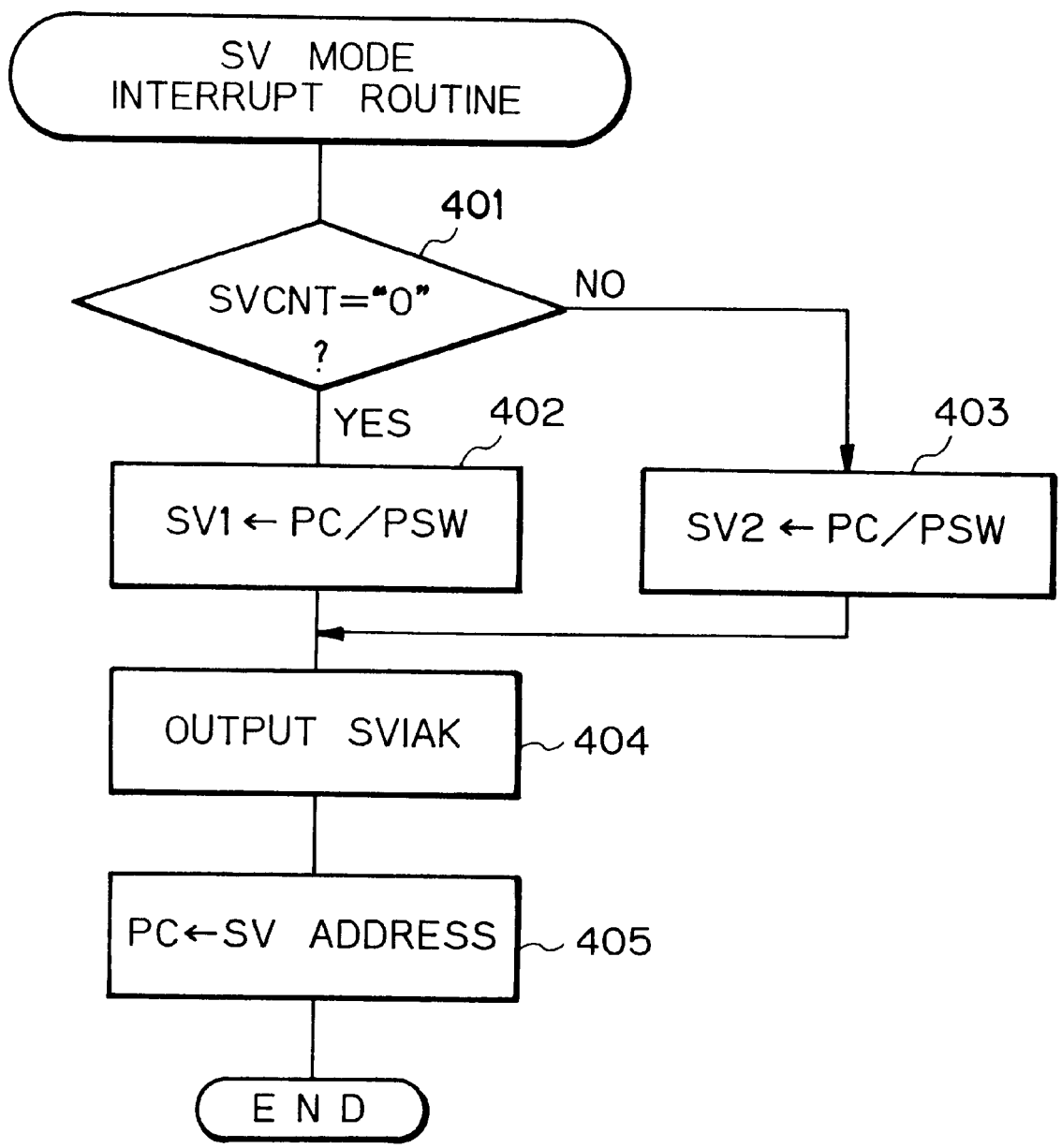
FIGS. 4, 5, 6, 7 and 11 are flowcharts for showing the operation of the microcomputer of FIG. 3.

FIG. 4 is an SV mode interrupt routine carried out by receiving an SV mode interrupt request signal SVI, which can be transmitted to the CPU 1 only under the condition that the SV mode signal SVMODE is "0" due to the presence of the selector SEL3

First, at step 401, ti is determined whether or not the count value SVCNT is "0". When SVCNT is "0" which means that this interrupt is a first SV mode interrupt, the control proceeds to step 402 which transmits the contents of the PC/PSW to a first stage (SV1) of the register 12. On the other hand, when SVCNT is "1" or "2" which means that this interrupt is a second SV mode interrupt, the control proceeds to step 403 which transmits the contents of the PC/PSW to a second stage (SV2) of the register 12. Note that the count value SVCNT cannot be larger than "2".

Next, at step 404, the CPU 1 generates an SV mode interrupt permission signal SVIAK. As a result, the SV mode signal SVMODE is changed from "0" to "1" by the SV mode control circuit 9, thus prohibiting the generation of an SV mode interrupt request signal SVI. Also, the SV mode interrupt counter 8 increments the count value SVCNT by +1. That is,

SVCNT←SVCNT+1

Next, at step 405, an initial address of an SV mode program is set in the PC, thus initiating the SV mode program.

Finally the control is completed at step 406.

Figure 5:
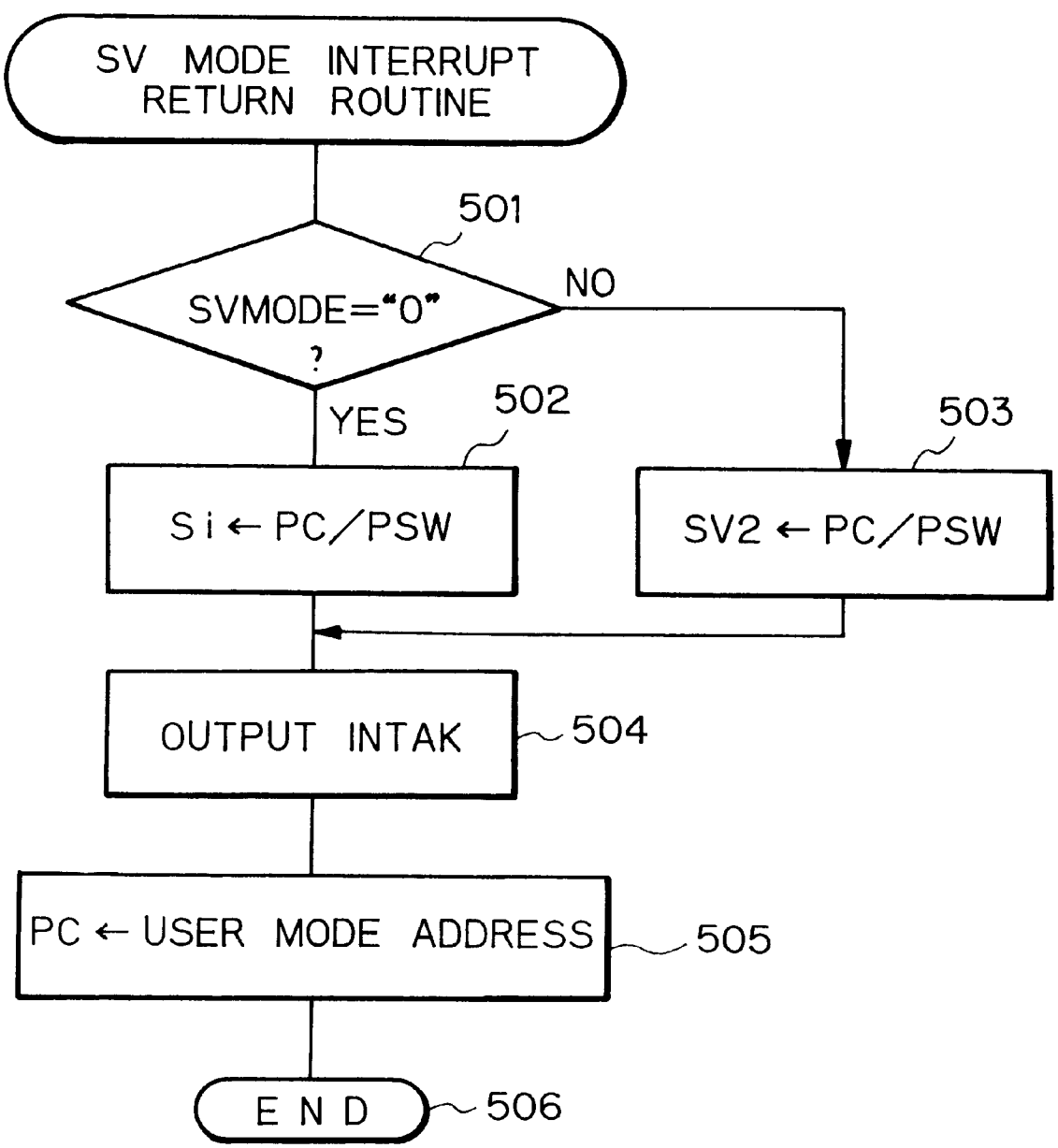

FIG. 5 is a user mode interrupt routine carried out by receiving a user mode interrupt request signal (INT1RQ, INT2RQ, . . . , or INT5RQ, which can be transmitted to the CPU 1 regardless of the SV mode signal SVMODE. However, if the SV mode signal SVMODE is "1", a user interrupt terminal such INTi needs to have higher priority than the interrupt terminal INT6.

First, at step 501, it is determined whether or not the SV mode signal SVMODE is "0". When SVMODE is "0" which means that another user mode interrupt routine is being executed, the control proceeds to step 502 which transmits the contents of the PC/PSW to a state (Si) of the stack 11. On the other hand, when SVMODE is "1" which means that an SV mode interrupt routine is being executed the control proceeds to step 503 which transmits the contents of the PC/PSW to the second state (SV2) of the register 12.

Next, at step 504, the CPU 1 generates a user mode interrupts permission signal INTAK. As a result, the SV mode signal SVMODE remains at "0" or is changed from "1" or "0" by the SV mode control circuit 9, thus enabling the generation of an SV mode interrupt request signal SVI. Also, the user mode interrupt counter 5 increments the count value INTCNT by +1. That is,

INTCVI←INTCNT+1

Next, at step 505, an initial address of a user mode program is set in the PC, thus initiating the user mode program.

Finally, the control is completed at step 506.

Figure 6:
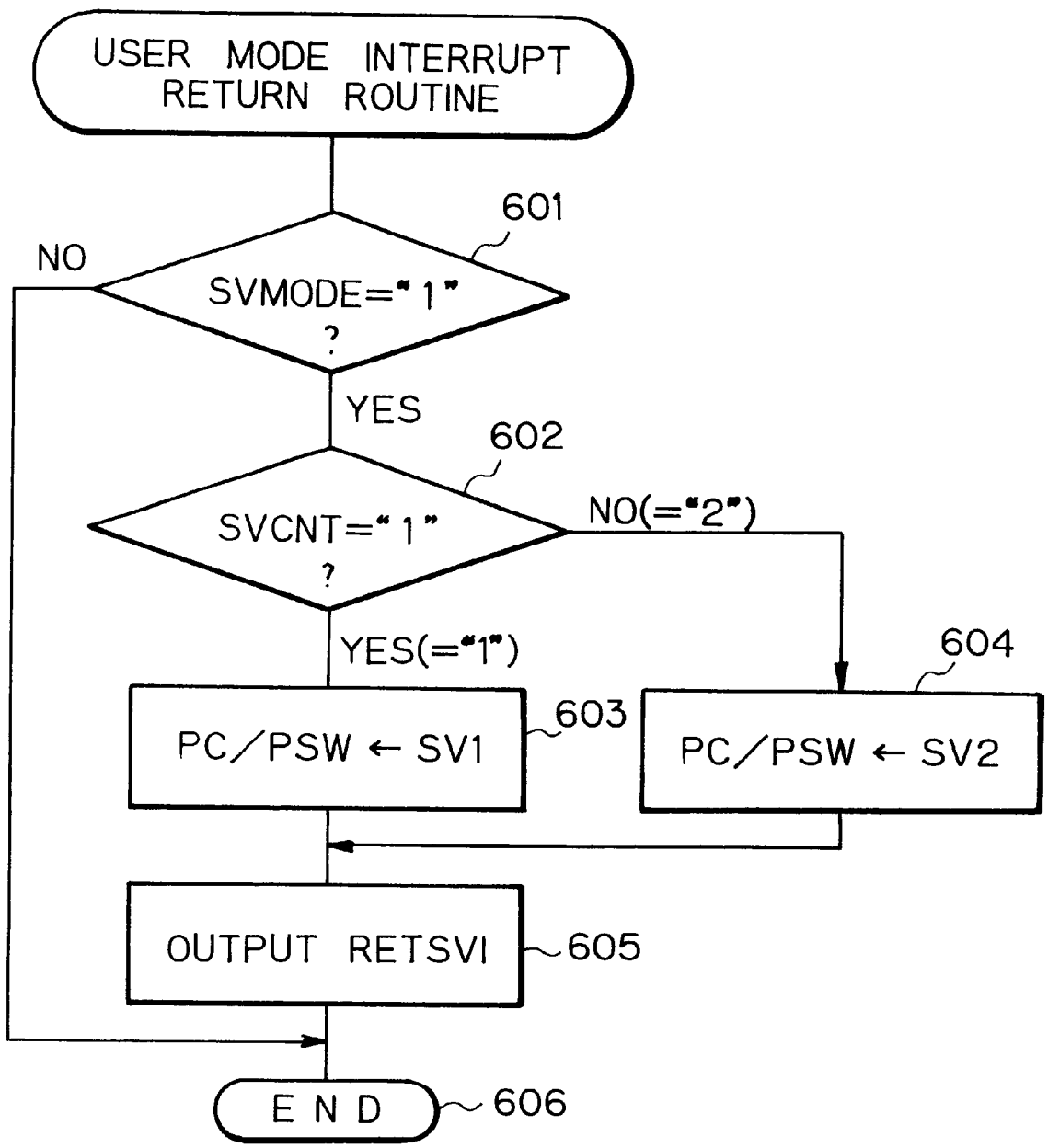

FIG. 6 is an SV mode interrupt return routine started by a completion of an SV mode interrupt program. At this completion, an SV mode interrupt return signal RETSVI is generated, but is output later at step 606.

First, at step 601, it is determined whether or not the S mode signal SVMODE is "1". Only if SVMODE is "0", does the control proceed to step 606. Otherwise, the control proceeds directly to step 606.

At step 602, it is determined whether or not the count value SVCNT is "1". In this case, note that the count value SVCNT is "1" or "2". When SVCNT is "1" which means that a first SV mode interrupt has completed the control proceeds to step 603 which transmits the contents of the first state (SV1) of the register 12 to the PC/PSW. On the other hand, when SVCNT is "2" which means that a second SV mode interrupt has completed, the control proceeds to step 604 which transmits the contents of the second stage (SV2) of the register 12 to the PC/PSW.

Next, at step 605, the CPU 1 outputs an SV mode interrupt return signal RETSVI. As a result, the SV mode signal SVMODE is changed from "1" to "0" by the SV mode control circuit 9, thus enabling the generation of another SV mode interrupt request signal SVI. Also, the SV mode interrupt counter 8 decrements the count value SVCNT by 1. That is,

SVCNT←SVCNT-1

Finally, the control is completed at step 606.

Figure 7:
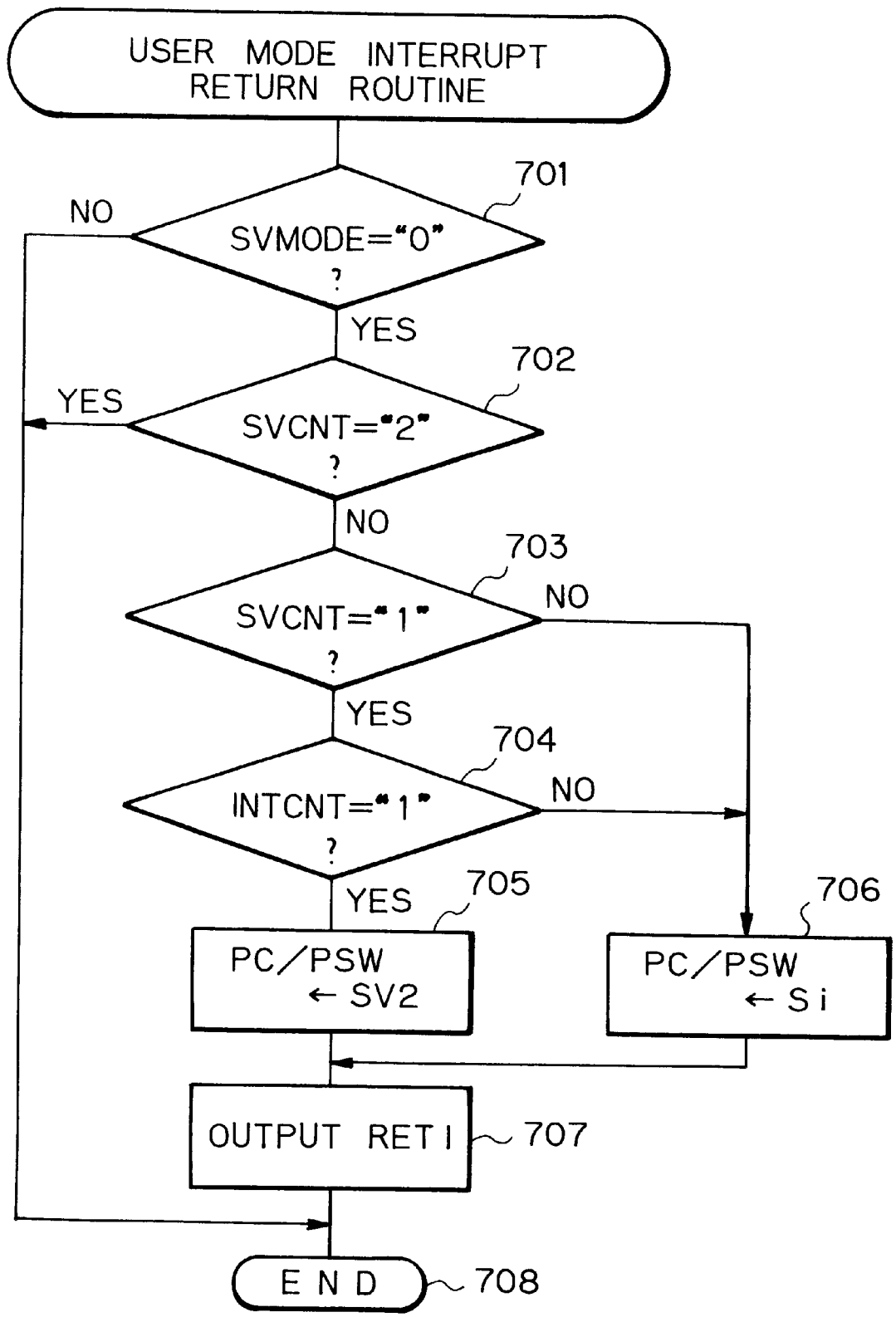

FIG. 7 is a user mode interrupt return routine started by a completion of a user mode interrupt program. At this state, a user mode interrupt return signal RETI is generated, but is output later at step 707.

First, at step 701, it is determined whether or not the SV mode signal SVMODE is "0". Only if SVMODE is "0", does the control proceed to step 702, otherwise, the control proceeds directly to step 708.

At step 702, it is determined whether or not the count value SVCNT is "2", i.e., the flag signal SVINEST is "1". Since all interrupts are prohibited for the count value SVCNT (="2"), all interrupt returns are also prohibited for the count value SVCNT (="2"). Therefore, if SVCNT="2", the control proceeds directly to step 708.

Step 703 determines whether or not the count value SVCNT is "1", and step 704 determines whether or not the count value INTCNT is "1". When SVCNT="1" and INTCNT="1", this means that a return has occurred from a user mode interrupt to an SV mode interrupt. Otherwise, this means that a return has occurred from a user mode interrupt to another user mode interrupt. Therefore, only when SVCNT="1" and INTCNT="1", does the control proceed to step 705. Otherwise, the control proceeds to step 706.

At step 705, the contents of the second stage (SV2) of the register 12 are transmitted to the PC/PSW. On the other hand, at step 706, the contents of a stage of the stack 11 are transmitted to the PC/PSW.

At step 707, the CPU 1 outputs a user mode interrupt return signal RETI. As a result, only when the control has proceeded from step 705 to step 707, RETI=INTCNT=SVCNT="1" is satisfied, so that the output of the SV mode signal SVMODE is changed from "0" to "1" by the SV mode control circuit 9. In addition, in any case, the count value INTCNT is decremented by

INTCNT←INTCNT-1

Finally, the control is completed at step 708.

Examples of the operation of the microcomputer of FIG. 3 are explained next with reference to FIGS. 8, 9 and 10 in accordance with the flowcharts 4, 5, 6 and 7.

Figure 8:
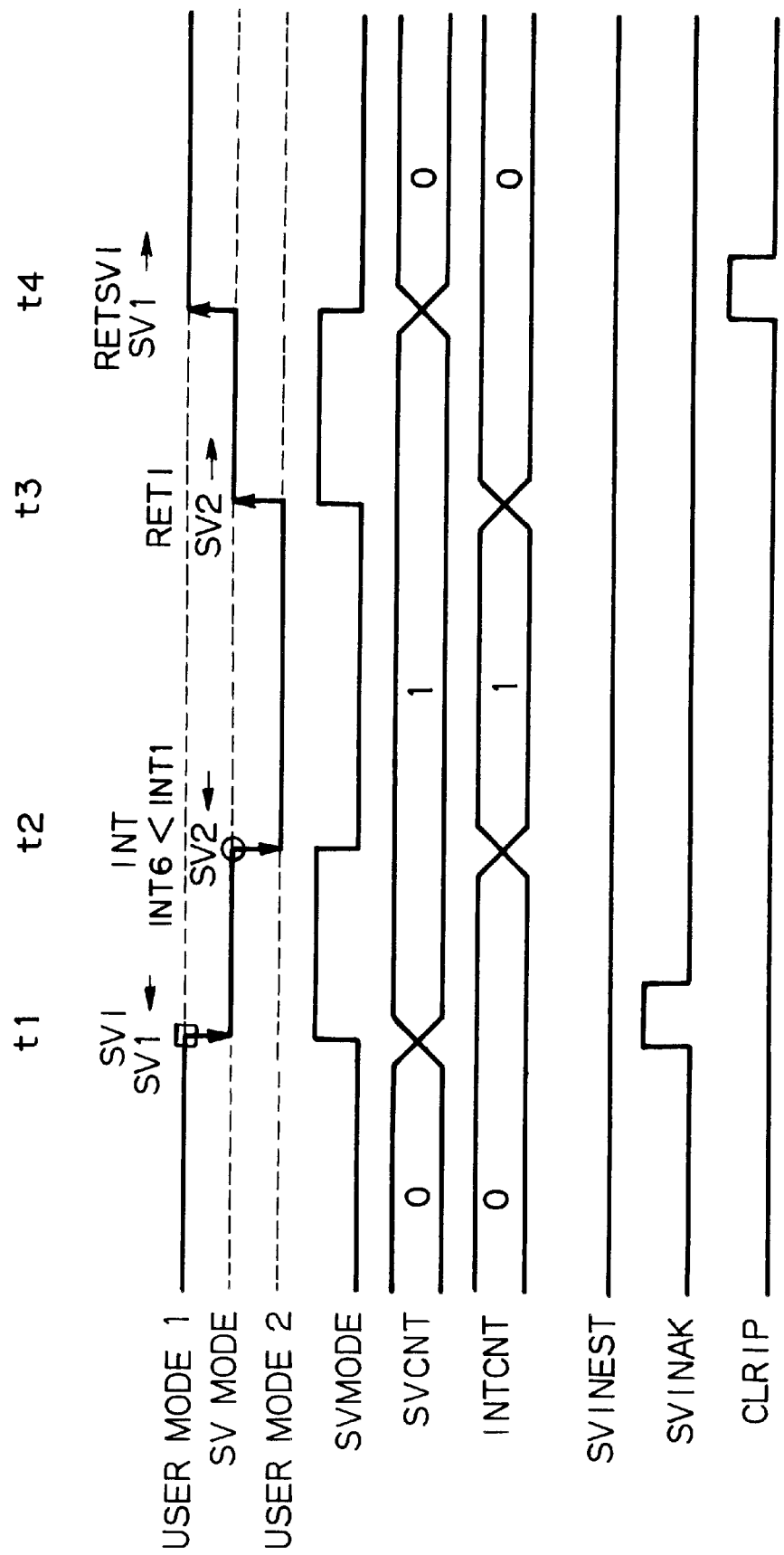
FIGS. 8, 9, 10 and 12 are timing diagrams for showing the operation of the microcomputer of FIG. 3.

In FIG. 8, at time t1, when an interrupt occurs from a user mode interrupt 1 to an SV mode interrupt, the steps of the flowchart of FIG. 4 are carried out to make the following changes:

SV1←PC/PSW

SVMODE←"1"

SVCNT←"1"

SVINAK←"1"

Next, at time t2, when an user mode interrupt 2 having a higher priority than the currently-executed user mode interrupt (i.e., the SV mode interrupt) occurs, the steps of the flowchart of FIG. 5 are carried out to make the following changes:

SV2←PC/PSW

SVMODE←"0"

SVCNT←"1"

Next, at time t3, when a return occurs from the user mode interrupt 2 to the SV mode interrupt, the steps of the flowchart of FIG. 7 are carried to make the following changes:

PC/PSW←SV2

SVMODE←"1"

INTCNT←"0"

Finally, at time t4, when a return occurs from the SV mode interrupt to the user mode interrupt 1, the steps of the flowchart of FIG. 6 are carried out to make the following changes:

PC/PSW←SV1

SVMODE←"0"

SVICNT←"0"

CLRIP←"1"

Figure 9:
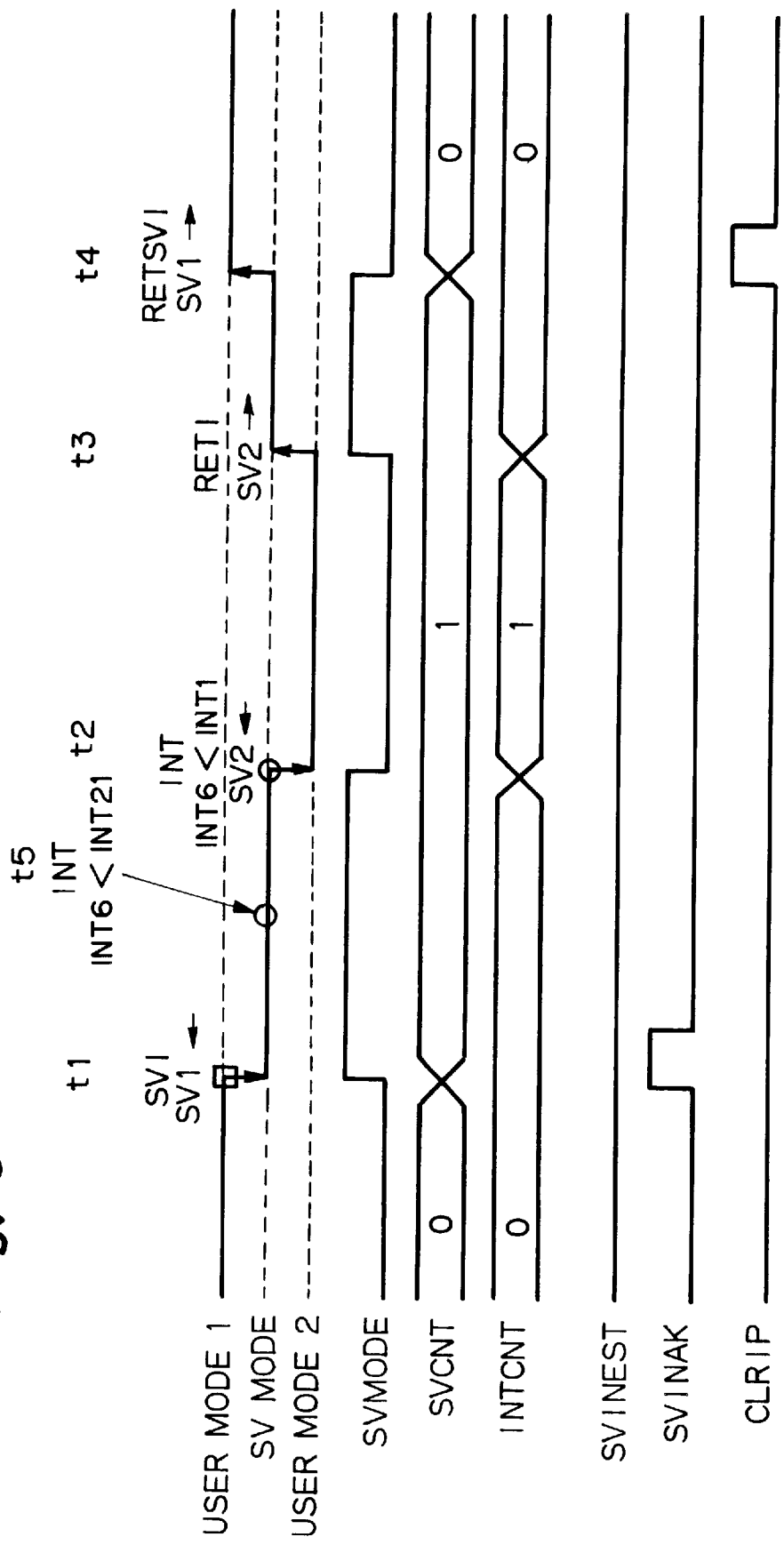

In FIG. 9, which is a modification of FIG. 8, at time t5 between times t1 and t2, a user mode interrupt occurs at the interrupt terminal INT2. In this case, the interrupt terminal INT6 (the SV mode interrupt terminal) has a higher priority than the interrupt terminal INT2. Therefore, such a user interrupt is made to wait at the user mode interrupt control circuit 2.

Figure 10:
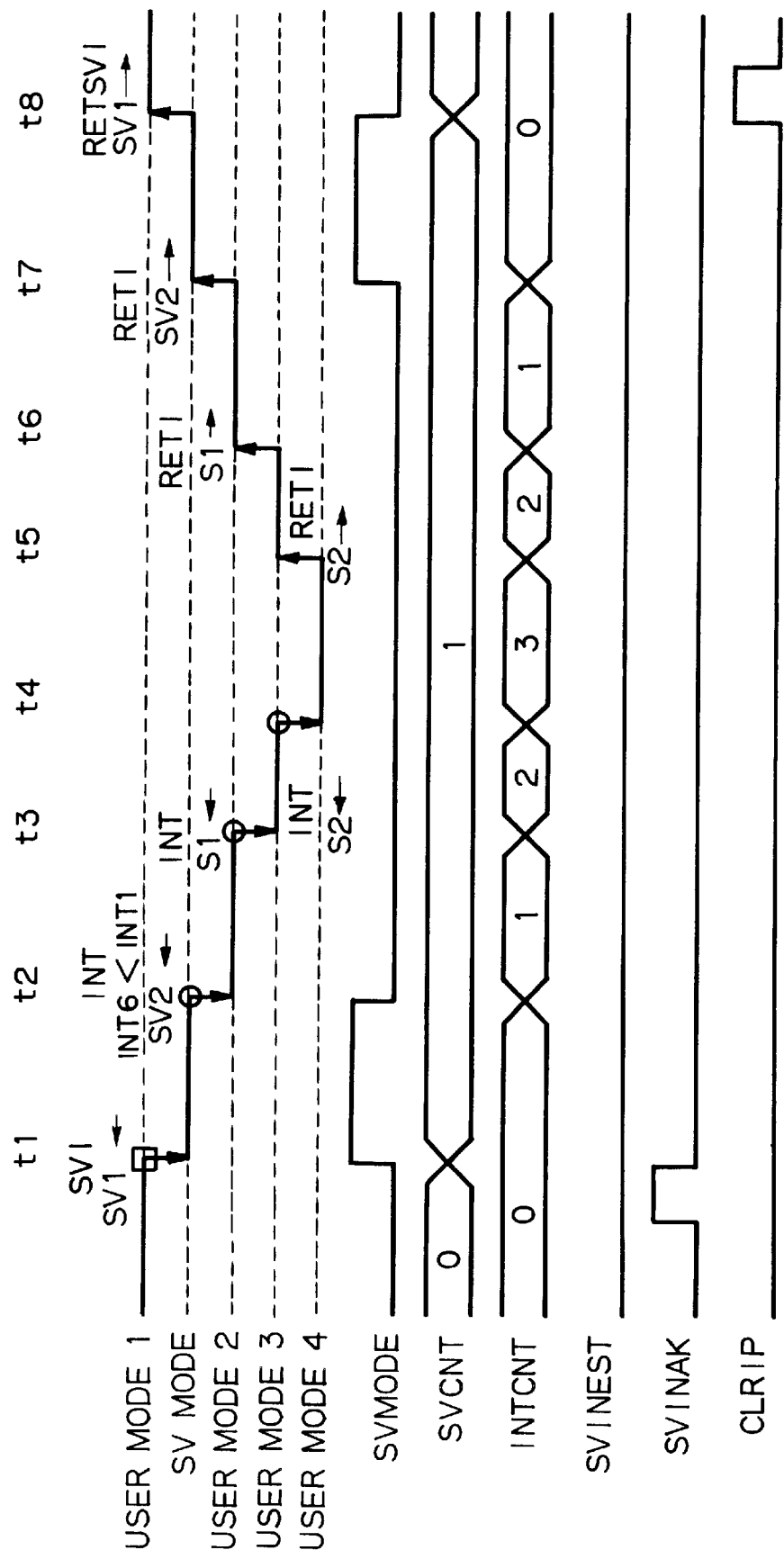

In FIG. 10, at time t1, when an interrupt occurs from a user mode interrupt 1 to an SV mode interrupt, the steps of the flowchart of FIG. 4 are carried out to make the following changes:

SV1←PC/PSW

SVMODE←"1"

SVCNT←"1"

SVINAK←"1"

Next, at time t2, when an user mode interrupt 2 having a higher priority than the currently-executed user mode interrupt (i.e., the SV mode interrupt) occurs, the steps of the flowchart of FIG. 5 are carried out to make the following changes:

SV2←PC/PSW

SVMODE←"0"

INCH←"1"

Next, at time t3, when another user mode interrupt 3 at the interrupt terminal INT3 having the currently-executed user mode interrupt occurs, the steps of the flowchart of FIG. 5 are carried out to make the following change:

S1←PC/PSW

INCNT←"2"

Next, at time t4, when another user mode interrupt 4 at the interrupt terminal INTm having the currently-executed user mode interrupt occurs, the steps of the flowchart of FIG. 5 are also carried out to make the following changes:

S2←PC/PSW

INCNT←"3"

At time t5, when a return occurs from the user mode interrupt 4 the user mode interrupt 3, the steps of the flowchart of FIG. 7 are carried out to make the following changes:

PC/PSW←S2

INCNT←"2"

At time t6, when a return occurs from the user mode interrupt 3 to the user mode interrupt 2, the steps of the flowchart of FIG. 7 are also carried out to make the following changes:

PC/PSW←S1

INCNT←"1"

Next, at time t7, when a return occurs from the user mode interrupt 2 to the SV mode interrupt, the steps of the flowchart of FIG. 7 are carried out to make the following changes:

PC/PSW←SV2

SVMODE←"1"

INTCNT←"0"

Finally, at time t8, when a return occurs from the SV mode interrupt to the user mode interrupt 1, the steps of the flowchart of FIG. 6 are carried out to make the following changes:

PC/PSW←SV1

SVMODE←"0"

SVICNT←"0"

CLRIP←"1"

Figure 11:
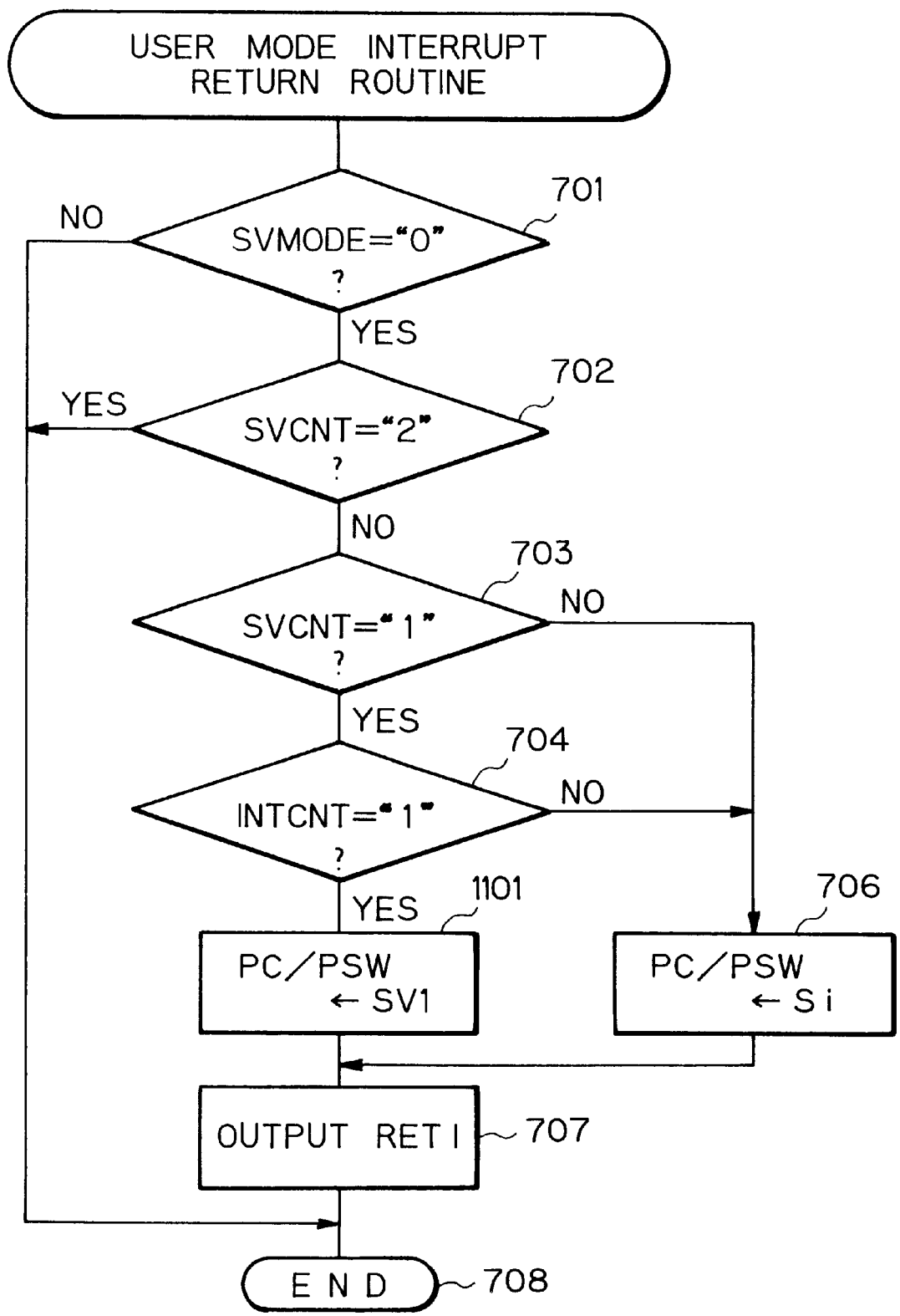

In FIG. 11, which is a modification of the flowchart of FIG. 7, step 1101 is provided instead of step 705 of FIG. 7. In this case, the SV mode control circuit 9 of FIG. 3 is also modified. That is, when RETI=INTCNT="1"and SVCNT= "0", the SV mode signal SVMODE becomes high (="1"). In other words, even when RETI=INTCNT=SVCNT="1", SVMODE never becomes "1". Therefore, at step 707 of FIG. 11, even when a user mode interrupt return signal RETI is generated, the SV mode signal SVMODE does not become "1", that is, SVMODE remains at "0".

An example of the operation of the microcomputer of FIG. 3 is explained next with reference to FIG. 12 in accordance with the flowcharts of FIGS. 4, 5, 6 and 11.

Figure 12:
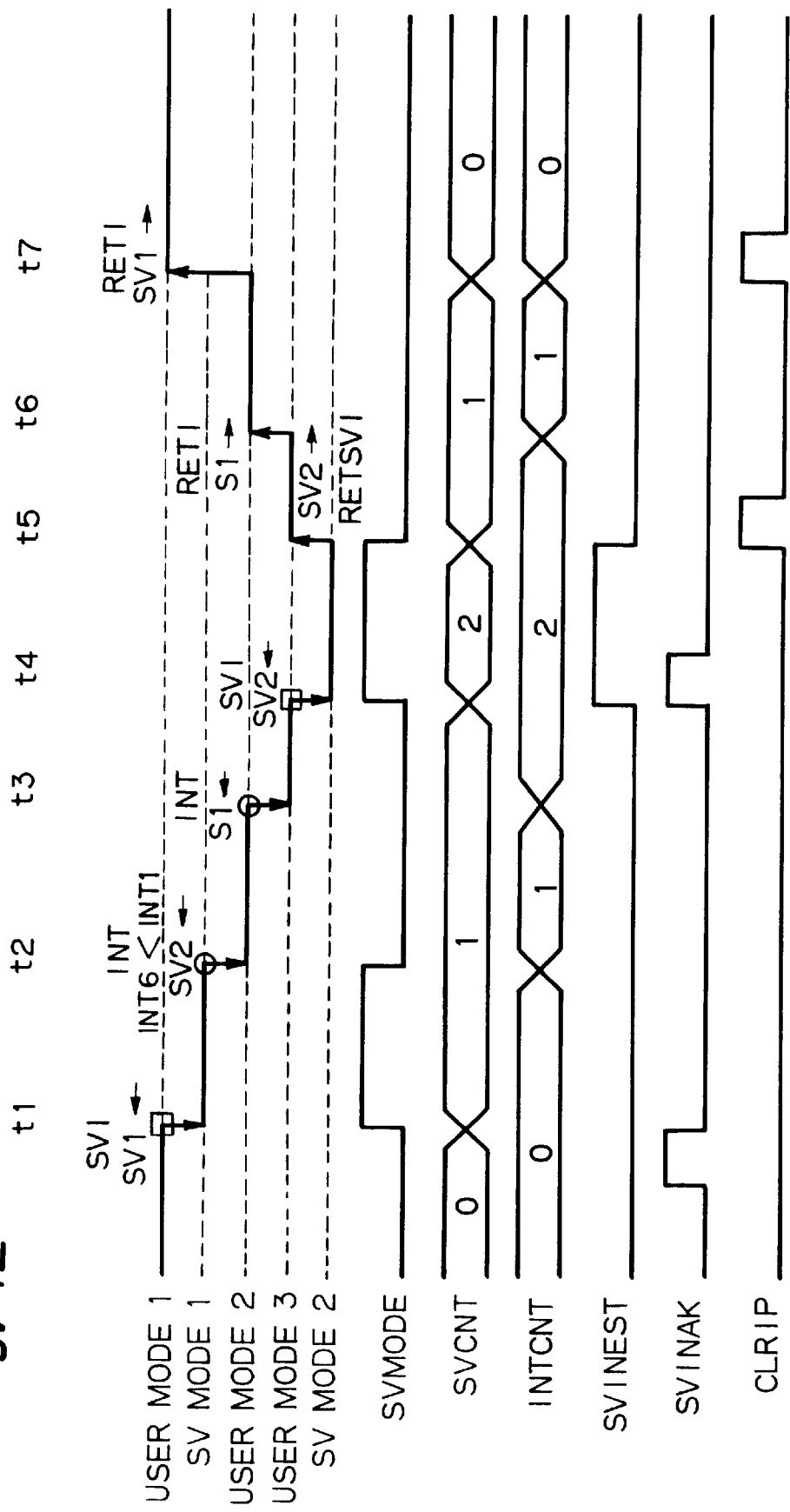

In FIG. 12, at time t1, when an interrupt occurs from a user mode interrupt 1 to an SV mode interrupt, the steps of the flowchart of FIG. 4 are carried out to make the following changes:

SV1←PC/PSW

SVMODE←"1"

SVCNT←"1"

SVINAK←"1"

Next, at time t2, when a user mode interrupt 2 having a higher priority than the currently-executed user mode interrupt (i.e., the SV mode interrupt) occurs, the steps of the flowchart of FIG. 5 are carried out to make the following changes:

SV2←PC/PSW

SVMODE←"0"

INCNT←"1"

Next, at time t3, when another user mode interrupt 3 at the interrupt terminal INT3 having the currently-executed user mode interrupt occurs, the steps of the flowchart of FIG. 5 are carried out to make the following changes:

S1←PC/PSW

INCNT←"2"

Next, at time t4, when another interrupt occurs from a user mode interrupt 3 to an SV mode interrupt, the steps of the flowchart of FIG. 4 are carried out to make the following changes:

SV2←PC/PSW

SVMODE←"1"

SVCNT←"2"

SVINEST←"1"

SVINAK←"1"

Thus, the contents of the second stage (SV2) of the register 12 are renewed, which cancels the SV mode interrupt 1.

At time t5, when a return occurs from the SV mode interrupt 2 to the user mode interrupt 3, the steps of the flowchart of FIG. 11 are carried out to made the following changes.

PC/PSW←S2

SVMODE←"0"

SVCNT←"1"

SVINEST←"0"

At time t6, when a return occurs from the user mode interrupt 3 to the user mode interrupt 2, the steps of the flowchart of FIG. 11 are also carried out to make the following changes:

PC/PSW←S1

INCNT←"1"

Finally, at time t7, when a return occurs from the user mode interrupt 2, the steps of the flowchart of FIG. 11 are carried out to make the following changes:

PC/PSW←SV1

SVMODE←"0"

INTCNT←"0"

SVICNT←"0"

CLRIP←"1"

That is, the V mode interrupt 1 is skipped.

As explained hereinabove, according to the present invention, since an SV mode interrupt can be treated as a kind of user mode interrupt, if a user mode interrupt having a higher priority than the SV mode interrupt occurs during the SV mode interrupt, such a user mode interrupt is permitted, thus avoiding an erroneous and abnormal operation during the SV mode interrupt.

I claim:

1. A microcomputer comprising:

a central processing unit (CPU);

a user mode interrupt control circuit, connected to said CPU, for generating a user mode interrupt request signal and transmitting said user mode interrupt request signal to said CPU;

a supervisor mode interrupt control circuit for generating a supervisor interrupt request signal; and selector means, connected to said CPU, said user mode interrupt control circuit and said supervisor mode interrupt control circuit, said supervisor mode interrupt request signal being transmitted from said supervisor mode interrupt control circuit via said user mode interrupt control circuit to said CPU when said selector means is in a second state.

2. The microcomputer as set forth in claim 1, wherein said selector means comprises:
- a first selector having a first input connected to an interrupt terminal, a second input connected to an output of said supervisor mode interrupt control circuit, and an output connected to said user mode interrupt control circuit;
- a second selector having a first input connected to the output of said supervisor mode interrupt control circuit, a second input, and an output connected to said CPU; and
- a third selector having an input connected to said user mode interrupt control circuit, a first output connected to the second input of said supervisor mode interrupt control circuit, and a second output connected to said CPU.

3. The microcomputer as set forth in claim 2, further comprising:
- an interface, connected to said first, second and third selectors, for controlling said first, second and third selectors; and
- a supervisor mode control circuit, connected between said CPU and said third selector, for controlling said third selector in accordance with whether or not said CPU carried out a supervisor mode interrupt operation.

4. The microcomputer as set forth in claim 1, wherein said CPU comprises:
- a program counter (PC)
- a processor status word (PSW);
- a stack to which contents of said PC and said PSW are retired; and
- a supervisory register to which the contents of said PC and said PSW are retired.

5. The microcomputer as set forth in claim 4, wherein said CPU further comprises:
- means for determining whether or not said supervisor mode interrupt request signal is received when another supervisor mode interrupt is halted;
- means for transmitting the contents of said PC and said PSW to a first stage of said supervisory register when said supervisory mode interrupt request signal is received while said other supervisor mode interrupt is not halted;
- means for transmitting the contents of said PC and said PSW to a first stage of said supervisory register when said supervisory mode interrupt request signal is received while said other supervisor mode interrupt is not halted;
- means for determining whether or not said user mode interrupt request signal is received when a supervisor mode interrupt is being carried out;
- means for transmitting the contents of said PC and said PSW to said stack when said user mode interrupt request signal is received while said supervisor mode interrupt is not being carried out;
- means for transmitting the contents of said PC and said PSW to the second stage of said supervisory register while said supervisor mode interrupt is being carried out;
- means for transmitting the content of one of the first and second stages of said supervisory register to said PC and said PSW when a supervisor mode interrupt return occurs;
- means for transmitting the contents of said PC and said PSW to said stack when said user mode interrupt request signal is received while said supervisor mode interrupt is not being carried out;
- means for transmitting the contents of said PC and said PSW to the second stage of said supervisory register while said supervisor mode interrupt is being carried out;
- means for transmitting the content of the second stage of said supervisor register to said PC and said PSW when a user mode interrupt return occurs while said supervisor mode interrupt is halted; and
- means for transmitting the content of said stack to said PC and said PSW when a user mode interrupt returns occurs while said supervisor mode interrupt is not halted.

6. The microcomputer as set forth in claim 4, wherein said CPU further comprises:
- means for determining whether or not said supervisor mode interrupt request signal is received when another supervisor mode interrupt is halted;
- means for transmitting the contents of said PC and said PSW to a first stage of supervisory register when said supervisory mode interrupt request signal is received while said other supervisor mode interrupt is not halted;
- means for transmitting the contents of said PC and said PSW to a first stage of said supervisory register when said supervisory mode interrupt request signal is received while said other supervisor mode interrupt is not halted;
- means for determining whether or not said user mode interrupt request signal is received when a supervisor mode interrupt is being carried out;
- means for transmitting the contents of said PC and said PSW to said stack when said user mode interrupt request signal is received while said supervisor mode interrupt is not being carried out;
- means for transmitting the contents of said PC and said PSW to said stack when said user mode interrupt request signal is received while said supervisor mode interrupt is not being carried out;
- means for transmitting the contents of said PC and said PSW to the second stage of said supervisory register while said supervisor mode interrupt is being carried out;
- means for transmitting the content of one of the first and second stages of said supervisory register to said PC and said PSW when a supervisor mode interrupt return occurs;
- means for transmitting the contents of said PC and said PSW to said stack when said user mode interrupt request signal is received while said supervisor mode interrupt is not being carried out;
- means for transmitting the contents of said PC and said PSW to the second stage of said supervisory register when said user mode interrupt request signal is received while said supervisor mode interrupt is being carried out;
- means for transmitting the content of the first stage of said supervisor register to said PC and said PSW when a user mode interrupt return occurs while said supervisor mode interrupt is halted; and
- means for transmitting the content of said stack to said PC and said PSW when a user mode interrupt return occurs while said supervisor mode interrupt is not halted.

7. A microcomputer comprising:

a user mode interrupt means for generating a user mod interrupt;

a non-user mode interrupt means for generating a non-user mode interrupt; and means for adjusting a precedence relation between said user mode interrupt and said non-user mode interrupt;

wherein said precedence relation adjusting means transmits said non-user mode interrupt to said user mode interrupt means, said non-user mod interrupt being considered as a kind of user mode interrupt.

8. A microcomputer comprising:

a central processing unit (CPU) having a program counter (PC), a processor status word register (PSW), and a stack and a supervisory register for storing contents of said PC and said PSW;

a user mode interrupt control circuit, connected to said CPU, for generating a user mode interrupt request signal and transmitting said user mode interrupt request signal to said CPU;

a supervisor mode interrupt control circuit for generating a supervisor interrupt request signal; and selector means, connected to said CPU, said user mode interrupt control circuit and said supervisor mode interrupt control circuit, said supervisor mode interrupt request signal being transmitted from said supervisor mode interrupt control circuit via said user mode interrupt control circuit to said CPU when said selector means is in a second state.

a supervisor mode control circuit, connected to said CPU and said selector means, for controlling said selector means in accordance with whether or not a supervisor mode interrupt is being carried out;

a supervisor mode interrupt counter connected to said CPU, said supervisor mode interrupt counter being counted up by 1 by an occurrence of a supervisor mode interrupt and being counted down by 1 by an occurrence of a supervisor mode interrupt return;

a user mode interrupt counter connected to said CPU, said user mode interrupt counter being counted up by 1 by an occurrence of a user mode interrupt and being counted up by 1 by an occurrence of a user mode interrupt and being counted down by 1 by an occurrence of a user more interrupt return;

said CPU transmitting contents of said PC and said PSW to a first stage of said supervisory register, when said supervisor mode interrupt request signal is received while a count value of said supervisor mode interrupt is "0", said CPU transmitting contents of said PC and said PSW to a first stage of said supervisory register, when said supervisor mode interrupt request signal is received while a count value of said supervisor mode interrupt is "0", said CPU transmitting contents of said PC and said PSW to the second stage of said supervisory register and said stack in accordance with an output signal of said supervisor mode control circuit, when said user mode interrupt request signal is received, said CPU transmitting a content of one of said first and second stages of said supervisory register to said PC and said PSW when a supervisor mode interrupt return occurs, said CPU transmitting the content of said second stage of said supervisory register to said PC and said PSW when a user mode interrupt occurs while the counter values of said supervisor mode interrupt counter and said user mode interrupt counter are both "1", said CPU transmitting the content of said stack to said PC and said PSW when a user mode interrupt occurs while one of the counter values of said supervisor mode interrupt counter and said user mode interrupt counter is not "1".

9. A microcomputer comprising:

a central processing unit (CPU) having a program counter (PC), a processor status word register (PSW), and a stack and a supervisory register for storing contents of said PC and said PSW;

a user mode interrupt control circuit, connected to said CPU, for generating a user mode interrupt request signal and transmitting said user mode interrupt request signal to said CPU;

a supervisor mode interrupt control circuit for generating a supervisor interrupt request signal; and selector means, connected to said CPU, said user mode interrupt control circuit and said supervisor mode interrupt control circuit, said supervisor mode interrupt request signal being transmitted from said supervisor mode interrupt control circuit via said user mode interrupt control circuit to said CPU when said selector means is in a second state.

a supervisor mode control circuit, connected to said CPU and said selector means, for controlling said selector means in accordance with whether or not a supervisor mode interrupt is being carried out;

a supervisor mode interrupt counter connected to said CPU, said supervisor mode interrupt counter being counted up by 1 by an occurrence of a supervisor mode interrupt and being counted down by 1 by an occurrence of a supervisor mode interrupt return;

a user mode interrupt counter connected to said CPU, said user mode interrupt counter being counted up by 1 by an occurrence of a user mode interrupt and being counted up by 1 by an occurrence of a user mode interrupt and being counted down by 1 by an occurrence of a user more interrupt return;

said CPU transmitting contents of said PC and said PSW to a first stage of said supervisory register, when said supervisor mode interrupt request signal is received while a count value of said supervisor mode interrupt is "0", said CPU transmitting contents of said PC and said PSW to a first stage of said supervisory register, when said supervisor mode interrupt request signal is received while a count value of said supervisor mode interrupt is "0", said CPU transmitting contents of said PC and said PSW to the second stage of said supervisory register and said stack in accordance with an output signal of said supervisor mode control circuit, when said user mode interrupt request signal is received, said CPU transmitting a content of one of said first and second stages of said supervisory register to said PC and said PSW when a supervisor mode interrupt return occurs, said CPU transmitting the content of said second stage of said supervisory register to said PC and said PSW when a user mode interrupt occurs while the counter values of said supervisor mode interrupt counter and said user mode interrupt counter are both "1", said CPU transmitting the content of said stack to said PC and said PSW when a user mode interrupt occurs while one of the counter values of said supervisor mode interrupt counter and said user mode interrupt counter is not "1".

* * * * *

UNITED STATES PATENT AND TRADEMARK OFFICE
CERTIFICATE OF CORRECTION

PATENT NO.  : 5,909,582
DATED       : June 1, 1999
INVENTOR(S) : Junichi NAKATA

It is certified that error appears in the above-identified patent and that said Letters Patent is hereby corrected as shown below:

| | | |
|---|---|---|
| Column 2, | line 49, | delete "defermined" and insert --determined--. |
| Column 4, | line 22, | delete "ti" and insert --it--. |
| Column 6, | line 21, | delete "SVCNT" and insert --INCNT--. |
| Column 6, | line 61, | delete "INCH" and insert --INCNT--. |
| Column 8, | line 43, | delete "V" and insert --SV--. |
| Column 10, | line 25, | delete "first" and insert --second--. |
| Column 10, | lines 37-41, | delete entire lines. |
| Column 11, | line 2-3, | delete "mod interrupt" and insert --mode interrupt--. |
| Column 11, | line 10, | delete "mod" and insert --mode--. |
| Column 11, | line 50, | delete "first" and insert --second--. |

UNITED STATES PATENT AND TRADEMARK OFFICE
CERTIFICATE OF CORRECTION

PATENT NO. : 5,909,582
DATED : June 1, 1999
INVENTOR(S) : Junichi Nakata

It is certified that error appears in the above-identified patent and that said Letters Patent is hereby corrected as shown below:

Column 11, line 53, delete "0" and insert --1--.

Column 12, line 44, delete "first" and insert --second--.

Column 12, line 46, delete "0" and insert --1--.

Signed and Sealed this

Eighteenth Day of January, 2000

Attest:

Q. TODD DICKINSON

*Attesting Officer*              *Commissioner of Patents and Trademarks*